United States Patent
Eicholz et al.

(10) Patent No.: US 10,482,165 B2
(45) Date of Patent: Nov. 19, 2019

(54) DECLARATIVE CASCADE REORDERING FOR STYLES

(71) Applicant: Microsoft Technology Licensing, LLC, Redmond, WA (US)

(72) Inventors: Arron J. Eicholz, Enumclaw, WA (US); Travis Leithead, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 15/068,536

(22) Filed: Mar. 11, 2016

(65) Prior Publication Data

US 2016/0275052 A1  Sep. 22, 2016

Related U.S. Application Data

(60) Provisional application No. 62/135,159, filed on Mar. 18, 2015.

(51) Int. Cl.
*G06F 17/22* (2006.01)
*G06F 17/21* (2006.01)

(52) U.S. Cl.
CPC ........ *G06F 17/2241* (2013.01); *G06F 17/211* (2013.01); *G06F 17/227* (2013.01); *G06F 17/2247* (2013.01)

(58) Field of Classification Search
None
See application file for complete search history.

(56) References Cited

U.S. PATENT DOCUMENTS

| | | | |
|---|---|---|---|
| 5,832,505 A | 11/1998 | Kasso et al. | |
| 7,562,070 B2 | 7/2009 | Tchaitchian et al. | |
| 8,176,416 B1 | 5/2012 | Williams et al. | |
| 8,468,449 B1 | 6/2013 | Hall | |
| 8,924,847 B2 | 12/2014 | Peters et al. | |
| 9,600,458 B2 * | 3/2017 | Guzman | G06F 16/9577 |
| 9,747,556 B2 * | 8/2017 | Garrison | G06N 99/005 |
| 9,767,083 B2 * | 9/2017 | Fei | G06F 17/2247 |
| 2005/0091587 A1 * | 4/2005 | Ramarao | G06F 17/2247 |
| | | | 715/248 |

(Continued)

OTHER PUBLICATIONS

"Office Action Issued in Colombian Patent Application No. NC2017/0009118", dated Sep. 14, 2017, 3 Pages.

(Continued)

*Primary Examiner* — Howard Cortes
(74) *Attorney, Agent, or Firm* — Arent Fox LLP

(57) ABSTRACT

In one example, a document rendering device may reorder a cascade level for a style property of a style sheet to maintain cohesion across multiple document components of a document. The document rendering device may store a style sheet describing rendering of a structured document having a nominal cascade level indicating a sheet hierarchy for the style sheet to resolve conflicts with style properties in other style sheets. The document rendering device may set a group cascade level for a property group describing a set of multiple style properties in the style sheet so that the group cascade level is different than the nominal cascade level. The document rendering device may render a document component of the structured document for display based on the property group at the group cascade level.

14 Claims, 7 Drawing Sheets

(56) References Cited

U.S. PATENT DOCUMENTS

| | | | |
|---|---|---|---|
| 2005/0268230 A1* | 12/2005 | Bales | G06F 17/212 |
| | | | 715/255 |
| 2006/0010374 A1 | 1/2006 | Corrington et al. | |
| 2006/0168519 A1 | 7/2006 | Torii et al. | |
| 2006/0218490 A1 | 9/2006 | Fink | |
| 2009/0300483 A1* | 12/2009 | Viet | G06F 17/2247 |
| | | | 715/236 |
| 2009/0327457 A1* | 12/2009 | Lees | G06F 17/227 |
| | | | 709/221 |
| 2010/0180194 A1* | 7/2010 | Ji | G06F 8/38 |
| | | | 715/234 |
| 2012/0005429 A1* | 1/2012 | Kalasapur | G06F 17/30899 |
| | | | 711/118 |
| 2012/0254731 A1 | 10/2012 | Peters et al. | |
| 2012/0278700 A1* | 11/2012 | Sullivan | G06F 17/218 |
| | | | 715/235 |
| 2012/0278701 A1* | 11/2012 | Bockus | G06F 17/218 |
| | | | 715/235 |
| 2013/0067322 A1 | 3/2013 | Gould et al. | |
| 2013/0159839 A1 | 6/2013 | Joffray et al. | |
| 2013/0174021 A1* | 7/2013 | Buchwald | G06F 17/227 |
| | | | 715/235 |
| 2013/0246909 A1* | 9/2013 | Carroll | G06F 17/2247 |
| | | | 715/235 |
| 2013/0290828 A1 | 10/2013 | Flake et al. | |
| 2013/0339843 A1 | 12/2013 | Guzman | |
| 2013/0339844 A1* | 12/2013 | Guzman | G06F 17/227 |
| | | | 715/235 |
| 2015/0007023 A1 | 1/2015 | Fei et al. | |
| 2015/0106753 A1* | 4/2015 | Tran | G05B 23/0272 |
| | | | 715/765 |

OTHER PUBLICATIONS

"International Search Report and Written Opinion Issued in PCT Application No. PCT/US2016/022991", dated Jun. 16, 2016, 7 Pages.

Lie, et al., "Cascading Style Sheets, level 1", In Proceedings of W3C Recommendation, Dec. 17, 1996, 65 pages.

Lie, et al., "CSS Cascading and Inheritance Level 3", In Proceedings of W3C Candidate Recommendation, Oct. 3, 2013, 20 pages.

Bowers, Michael, "Pro CSS and HTML Design Patterns", In Proceedings of Apress, Apr. 24, 2007, 527 pages.

Mesbah, et al., "Automated Analysis of CSS Rules to Support Style Maintenance", In Proceedings of 34th International Conference on Software Engineering, Jun. 2, 2012, 11 pages.

"Managing Style Sheets", Available at: <<https://msdn.microsoft.com/en-us/library/ms533039%28v=vs.85%29.aspx>>, Apr. 8, 2011, pp. 2.

"!important Declarations", Available at: <<http://www.sitepoint.com/web-foundations/important-declarations/>>, May 15, 2014, pp. 3.

"Office Action Issued in Colombian Patent Application No. NC2017/0009118", dated Jun. 6, 2018, 15 Pages. (W/o English Translation).

"Office Action Issued in Chile Patent Application No. 02305-2017", dated Sep. 20, 2018, 8 Pages.

"Write more, do less", Retrieved From: http://morecss.org, Apr. 1, 2012, 6 Pages.

"Office Action Issued in Chilean Patent Application No. 02305-2017", dated Nov. 14, 2018, 8 Pages.

"Search Report Issued in European Patent Application No. 16765800.4", dated Nov. 13, 2018, 7 Pages.

* cited by examiner

| |
|---|
| TRANSITION 320 |
| IMPORTANT USER AGENT 318 |
| IMPORTANT DEFAULT 324 |
| IMPORTANT USER 316 |
| IMPORTANT OVERRIDE 314 |
| IMPORTANT AUTHOR 312 |
| ANIMATION 310 |
| NORMAL OVERRIDE 308 |
| NORMAL AUTHOR 306 |
| NORMAL USER 304 |
| NORMAL DEFAULT 322 |
| NORMAL USER AGENT 302 |

DECLARATIVE CASCADE REORDERING FOR STYLES

PRIORITY INFORMATION

This application claims priority from U.S. Provisional Patent Application Ser. No. 62/135,159, filed Mar. 18, 2015, the contents of which are incorporated herein by reference in its entirety.

BACKGROUND

A computing device may render a data content set described in a markup language for presentation to a user as a document. A markup language is a language that facilitates annotating a text document that separates an annotation from the text to be presented to the user, such as a hypertext markup language. A data content set may describe the document as a document tree having multiple nodes. Each node may describe a document component of the document. Different authors may create different document components of the document.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to reordering a cascade level for a style property of a style sheet to maintain cohesion across multiple document components of a document. The document rendering device may store a style sheet describing rendering of a structured document having a nominal cascade level indicating a sheet hierarchy for the style sheet to resolve conflicts with style properties in other style sheets. The document rendering device may set a group cascade level for a property group describing a set of multiple style properties in the style sheet so that the group cascade level is different than the nominal cascade level. The document rendering device may render a document component of the structured document for display based on the property group at the group cascade level.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 3 illustrates, in a block diagram, one example of a cascade level hierarchy.

DETAILED DESCRIPTION

Figure 1:
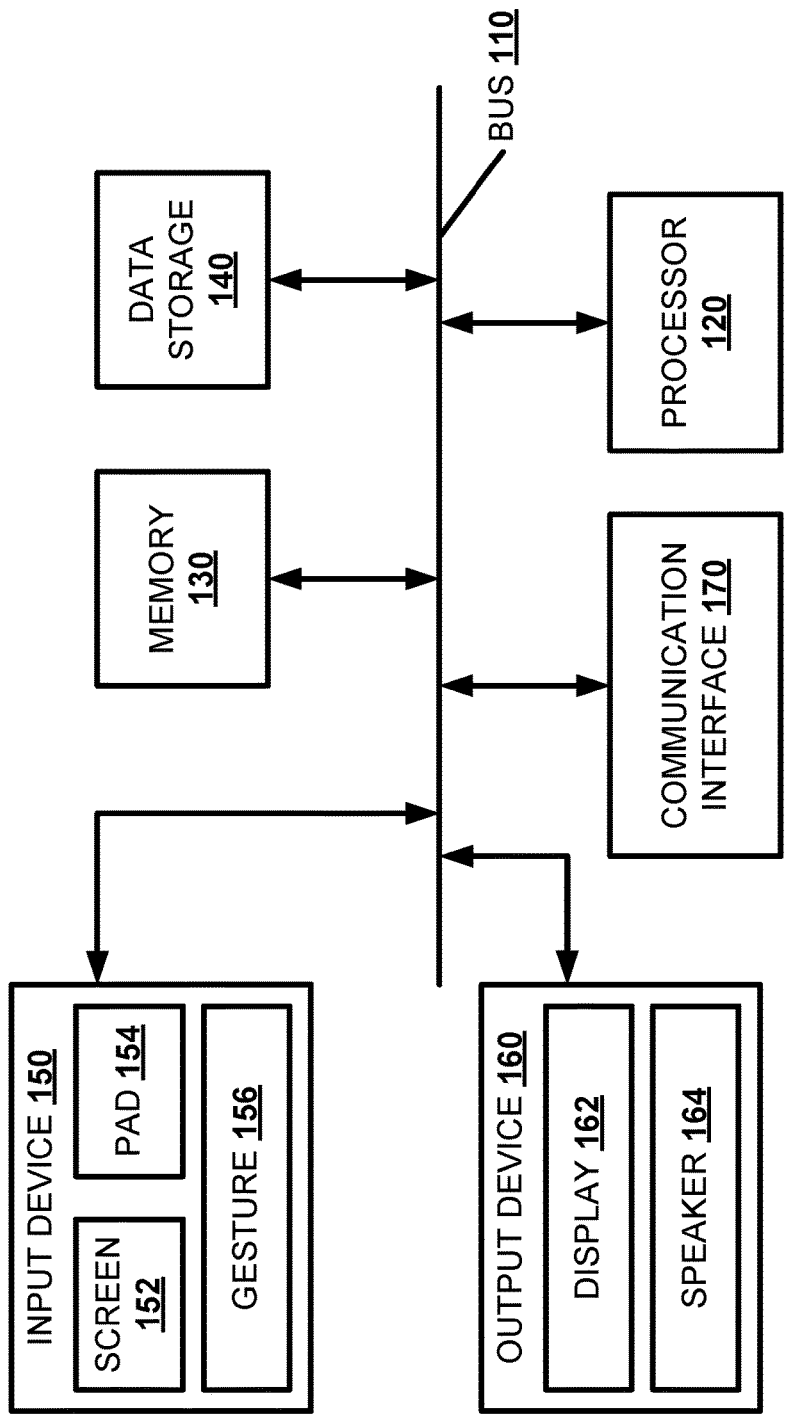
FIG. 1 illustrates, in a block diagram, one example of a computing device.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a document rendering device, a computing device, or a machine-implemented method.

In one example, a document rendering device may reorder a cascade level for a style property of a style sheet to maintain cohesion across multiple document components of a document. The document rendering device may store a style sheet describing rendering of a structured document having a nominal cascade level indicating a sheet hierarchy for the style sheet to resolve conflicts with style properties in other style sheets. The document rendering device may set a group cascade level for a property group describing a set of multiple style properties in the style sheet so that the group cascade level is different than the nominal cascade level. The document rendering device may render a document component of the structured document for display based on the property group at the group cascade level.

The existing cascade level hierarchy constrains an author of a style sheet to enter a style sheet at a specific cascade level. As such, the author of a style sheet may accidentally overwrite a property value that the author wanted to preserve. This overwriting may be particularly problematic in collaborative projects, with document components provided by multiple authors. By providing a rule to lower the cascade level of a style sheet, the document rendering device may provide the author a tool for setting a property value that is less likely to overwrite existing property values, which are more likely to be entered in a style sheet having a higher cascade level. For example, a style sheet may define a style sheet at a specially created default cascade level even if the style sheet source nominally indicates a different cascade level. Additionally, the author of a style sheet may specify a single property or a group of properties within the style sheet to be set at a specific cascade level. Thus, the author of the main document may provide a default property value that may be overwritten by authors of the document components. Also, the author of the main document may promote a group of properties within the style sheet to a higher cascade level, so that the group of properties may be consistent across document components.

A document rendering device may use a cascading style sheet to collate style rules in rendering a structured document. By way of cascading and inheritance, a style sheet may propagate a property value across multiple elements. A cascading style sheet is a language structure for describing the rendering of the structured document, as described with a hypertext markup language or an extensible markup language, across varied output devices, such as a display screen, a paper, a speech output, or other media.

Cascading may allow multiple style sheets to influence the presentation of a document by resolving conflicts between different declarations setting a value for the same style property. A style sheet may have a cascade level indicating a sheet hierarchy for the style sheet to resolve conflicts with style properties in other style sheets. A document rendering device may determine a cascade level based on the source of the style sheet. Conversely, when a style sheet fails to set a value for a style property, the document rendering device may find a value using inheritance and a style property's initial value.

The document rendering device may receive a set of declarations as input, and output a specified value for each style property on each element. The document rendering device may use a "@import" rule to import style rules from other style sheets. A "@import" rule may precede other at-rules and style rules in a style sheet to prevent invalidity of the "@import" rule. However, the style sheet may begin with a "@charset" rule, if present. The syntax of "@import" may be formatted:

@import [<url>|<string>|<media-query-list>];

If a <string> is provided, the document rendering device may interpret the string as a uniform resource locator with the same value. For example, the following lines may be equivalent in meaning:

@import "mystyle.css";
@import url("mystyle.css");

If an "@import" rule refers to a valid stylesheet, a user agent application may treat the contents of a style sheet as if written in place of the "@import" rule.

In an alternate example, declarations in style rules from imported stylesheets interact with a cascading style sheet as if written literally into the stylesheet at the point of the "@import". Similarly, style rules in a stylesheet imported into a scoped stylesheet may be scoped in the same way.

When the same style sheet is imported or linked to a document in multiple places, a document rendering device may process each link as though the link were to a separate style sheet. Assuming appropriate caching, a user agent may fetch a style sheet once, even if linked or imported multiple times. The origin of an imported style sheet may be the same as the origin of the importing style sheet. Similarly, the environment encoding of an imported style sheet may be the encoding of the importing style sheet.

A '@default' rule may allow a style sheet to define a style sheet at a near user agent cascade level even if the style sheet source nominally indicates a different cascade level. Any '@default' rules may precede other at-rules and style rules in a style sheet, excluding '@charset' and "@import", or else the '@default' rule may be invalid. The default cascade level may be described as:

```
default
    : DEFAULT_SYM S* group_rule_body
    ;
    @{D} {E} {F} {A} {U} {L} {T} {return DEFAULT_SYM;}
```

For example:

```
@default {
    * { all: initial; }
    div { display: block; }
    span { display: inline; }
    input { display: inline-block; }
    ...
}
```

Some properties may be shorthand properties, meaning that they allow authors to specify the values of several properties with a single style property. A shorthand style property may set each longhand sub-property, exactly as if expanded in place. For example, the font property may be is a shorthand style property for setting font-style, font-variant, font-weight, font-size, line-height, and font-family all at once. The multiple declarations of this example:

```
h1 {
    font-weight: bold;
    font-size: 12pt;
    line-height: 14pt;
    font-family: Helvetica;
    font-variant: normal;
    font-style: normal;
}
``` may therefore be rewritten as h1 {font: bold 12 pt/14 pt Helvetica}

When values are omitted from a shorthand form, unless otherwise defined, each "missing" sub-property may be assigned the initial value of the style property. This means that a shorthand style property declaration may set each sub-property, even those not explicitly set. Declaring a shorthand style property to be '|important' may be equivalent to declaring all of its sub-properties to be '|important'.

By setting up a default cascade level, an author may set up a style sheet that does not unintentionally overwrite a style property from a pre-existing lower cascade level. The default cascade level may be inserted close to the user agent cascade level. The syntax for the default cascade level may allow a style sheet to group a set of properties together to be arranged in a cascade level order that allows for greater cohesion between document components of a document. A property hierarchy indicator may be used with individual properties to better place those properties within the hierarchy of the cascade levels.

FIG. 1 illustrates a block diagram of an exemplary computing device 100 which may act as a data rendering device. The computing device 100 may combine one or more of hardware, software, firmware, and system-on-a-chip technology to implement a data rendering device. The computing device 100 may include a bus 110, a processing unit 120, a memory 130, a data storage 140, an input device 150, an output device 160, and a communication interface 170. The bus HO, or other component interconnection, may permit communication among the components of the computing device 100.

The processing unit 120 may include at least one conventional processor or microprocessor that interprets and executes a set of instructions. The at least one processor may process a style sheet having a nominal cascade level. The at least one processor may be configured to identify a property group in the style sheet. The at least one processor may be configured to identify in the style sheet a group rule defining a group cascade level for the property group. The at least one processor further may be configured to set a group cascade level for the property group describing a set of multiple style properties in the style sheet in accordance with the group rule so that the group cascade level is different than a nominal cascade level for the style sheet. The group cascade level may be lower than the nominal cascade level for the style sheet, such as between a normal user cascade level and a normal user agent cascade level.

The at least one processor may be configured to identify a style property, possibly contained in the property group, in the style sheet. The at least one processor may be configured to identify a property cascade level for the style property with a property hierarchy indicator. The at least one processor may be configured to set a property cascade level for a style property lower than the nominal cascade level based on the property hierarchy indicator.

The at least one processor may render a document component of the structured document for display based on the property group at the group cascade level. Alternately, the at least one processor may render a document component of the structured document for display based on the style property at the property cascade level. The at least one processor may be configured to insert the document component into the structured document. The at least one processor may be configured to apply the property group to the structured document at the group cascade level. Alternately, the at least one processor may be configured to apply the style property to the document at the property cascade level.

The memory 130 may be a random access memory (RAM) or another type of dynamic data storage that stores information and instructions for execution by the processor 120. The memory 130 may also store temporary variables or other intermediate information used during execution of instructions by the processor 120. The memory may store a series of instructions to execute a document rendering application. The memory may be configured to store a style sheet describing rendering of a structured document having a nominal cascade level indicating a sheet hierarchy for the style sheet to resolve conflicts with style properties in other style sheets. The style sheet may be an author style sheet at an author cascade level or a user style sheet at a user cascade level. The memory 130 may be configured to associate a group rule defining a group cascade level with a property group. The memory 130 may be configured to associate a property hierarchy indicator with a style property of the property group.

The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface for storing a data content set and style sheets.

The input device 150 may include one or more conventional mechanisms that permit a user to input information to the computing device 100, such as a keyboard, a mouse, a voice recognition device, a microphone, a headset, a touch screen 152, a touch pad 154, a gesture recognition device 156, etc. The output device 160 may include one or more conventional mechanisms that output information to the user, including a display screen 162, a printer, one or more speakers 164, a headset, a vibrator, or a medium, such as a memory, or a magnetic or optical disk and a corresponding disk drive. The display screen 162 may be configured to display the document component to a user.

The communication interface 170 may include any transceiver-like mechanism that enables computing device 100 to communicate with other devices or networks. The communication interface 170 may include a network interface or a transceiver interface. The communication interface 170 may be a wireless, wired, or optical interface. The communication interface may be configured to import a style sheet from a plug-in as a user style sheet at a user cascade level. The communication interface may be configured to import a style sheet from a data content set as an author style sheet at an author cascade level.

The computing device 100 may perform such functions in response to processor 120 executing sequences of instructions contained in a computer-readable medium, such as, for example, the memory 130, a magnetic disk, an optical disk, or a solid state media. Such instructions may be read into the memory 130 from another computer-readable medium, such as the data storage 140, or from a separate device via the communication interface 160.

Figure 2:
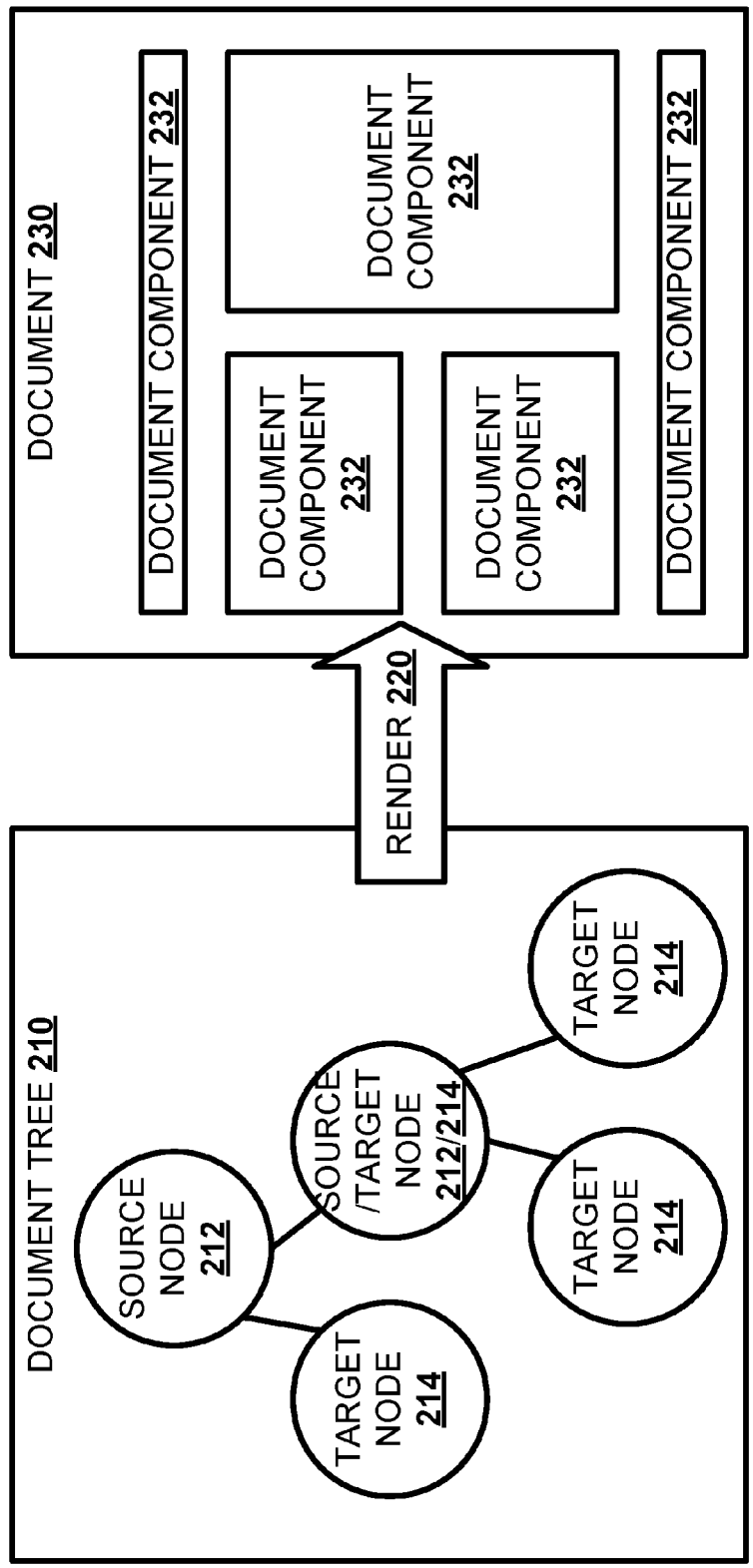
FIG. 2 illustrates, in a block diagram, one example of a document rendering process.

FIG. 2 illustrates, in a block diagram, one example of a document rendering process 200. The document rendering device may process a data content set, written in a markup language organizing the data content set as a document tree 210. The document tree 210 may have a set of one or more nodes. A node of the document tree 210 may be a source node 212 or a target node 214. The source node 212 may provide context or structure within the document tree for the target node 214. A node may be a source node 212 for a node lower in the document tree 210 and a target node 214 for a node higher in the document tree 210. The document rendering device may render 220 the document tree 210 into a document 230. Each node of the document tree 210 may be rendered 220 into a document component 232 composing the document 230. For example, the document component 232 may be a graph, a text piece, an audio clip, a video, an applet, a menu, or a frame.

The document rendering device may format each document component 232 based on a set of one or more style sheets describing a set style properties. The document rendering device may introduce a style sheet via any one of a number sources. The document rendering device may use a set of cascading style sheets to select between conflicting properties from multiple style sheets. A style property of a style sheet from a higher cascade level may overwrite a conflicting style property of a style sheet from a lower cascade level. For example, if a style sheet with a high cascade level describes a text as having a red color and a style sheet with a low cascade level describes a text as having a green color, the text of the rendered document has a red color. The document rendering device may assign the cascade level based on the source of the style sheet.

FIG. 3 illustrates, in a block diagram, one example of a cascade level hierarchy 300. The cascade level hierarchy 300 may have a normal progression in an unaltered state. At a lowest cascade level, the document rendering device may receive a user agent style sheet from a user agent application, such as a browser, at a normal user agent cascade level 302. At a higher cascade level, the document rendering device may receive a user style sheet from a user application, such as a user interface plug-in, at a normal user cascade level 304. The document rendering device may receive an author style sheet from a data content set, such as a web page, at a normal author cascade level 306. The document rendering device may receive an override style sheet from an application script, such as an application, at a normal override cascade level 308. The document rendering device may receive an animation style sheet from an animation at a normal animation cascade level 310.

A style sheet may use a property hierarchy indicator label of important to create a reprioritized order of cascade levels on top of the normal cascade levels. For example, the property hierarchy indicator label of important may be described using the text string "|important". Above a normal cascade level, the document rendering device may receive an important author style sheet from a data content set at an important author cascade level 312. The document rendering device may receive an important override style sheet from an application script at an important override cascade level 314. The document rendering device may receive an important user style sheet from a user application at an important user cascade level 316. The document rendering device may receive an important user agent style sheet from a user agent application at an important user agent cascade level 318. At the highest cascade level, the document rendering device may receive a transition style sheet to transition a property value from a user agent application at a transition animation cascade level 320.

A style sheet may use a @default rule to set the cascade level of the style sheet at a normal default cascade level 322, between the normal user cascade level 304 and the normal user agent cascade level 302. Thus an author may create a style sheet establishing one or more default style properties to be overwritten by a style sheet with a cascade level of a normal user cascade level 304 or higher. Similarly, a style sheet may use a @default rule with a |important indicator to set the cascade level of a style property at an important default cascade level 324, between the important user cascade level 316 and the important user agent cascade level 318. Thus an author may create a style sheet establishing style consistency over a document by overwriting any style sheet with a cascade level of an important user cascade level 316 or lower.

A style sheet may reclassify the cascade level to create consistency across document components. The document rendering device may receive the style sheet as an author style sheet from a web page, creating a nominal cascade level of an author cascade level 306, or a user style sheet from a browser plug-in, creating nominal cascade level of a user cascade level 304. The style sheet may identify a property group describing a set of multiple properties. The style sheet may change the group cascade level for the property group. For example, the style sheet may set the group cascade level for the property group to a normal default cascade level 322. Thus, a style property of the property group may be overwritten by a conflicting style property in a style sheet with a cascade level of a normal user cascade level 304 or higher.

Similarly, the style sheet may use a property hierarchy indicator to reclassify the cascade level of an individual style property. For example, the style property may be in a property group having a group cascade level of a normal default cascade level 322. If the style sheet associates a style property of that property group with an "|important" property hierarchy indicator, the style property may have a property cascade level of an important default cascade level 324. Thus, the style property may be overwritten by a conflicting style property with a cascade level of an important user agent cascade level 318 or higher, and may overwrite a conflicting style property with a cascade level of an important user cascade level 316. Alternately, a style sheet may associate a style property with a property hierarchy indicator demoting the style property to a lower cascade level. For example, a property hierarchy indicator of "|unimportant" may move the property cascade level down a set number of cascade levels, such as moving a style property from a style sheet at a normal override cascade level 308 down two cascade levels to a normal user cascade level 304. Further, a property hierarchy indicator may identify a specific cascade level. For example, a property hierarchy indicator of "|normaluseragent" may move the property cascade level to a normal user agent cascade level 302.

Figure 4:
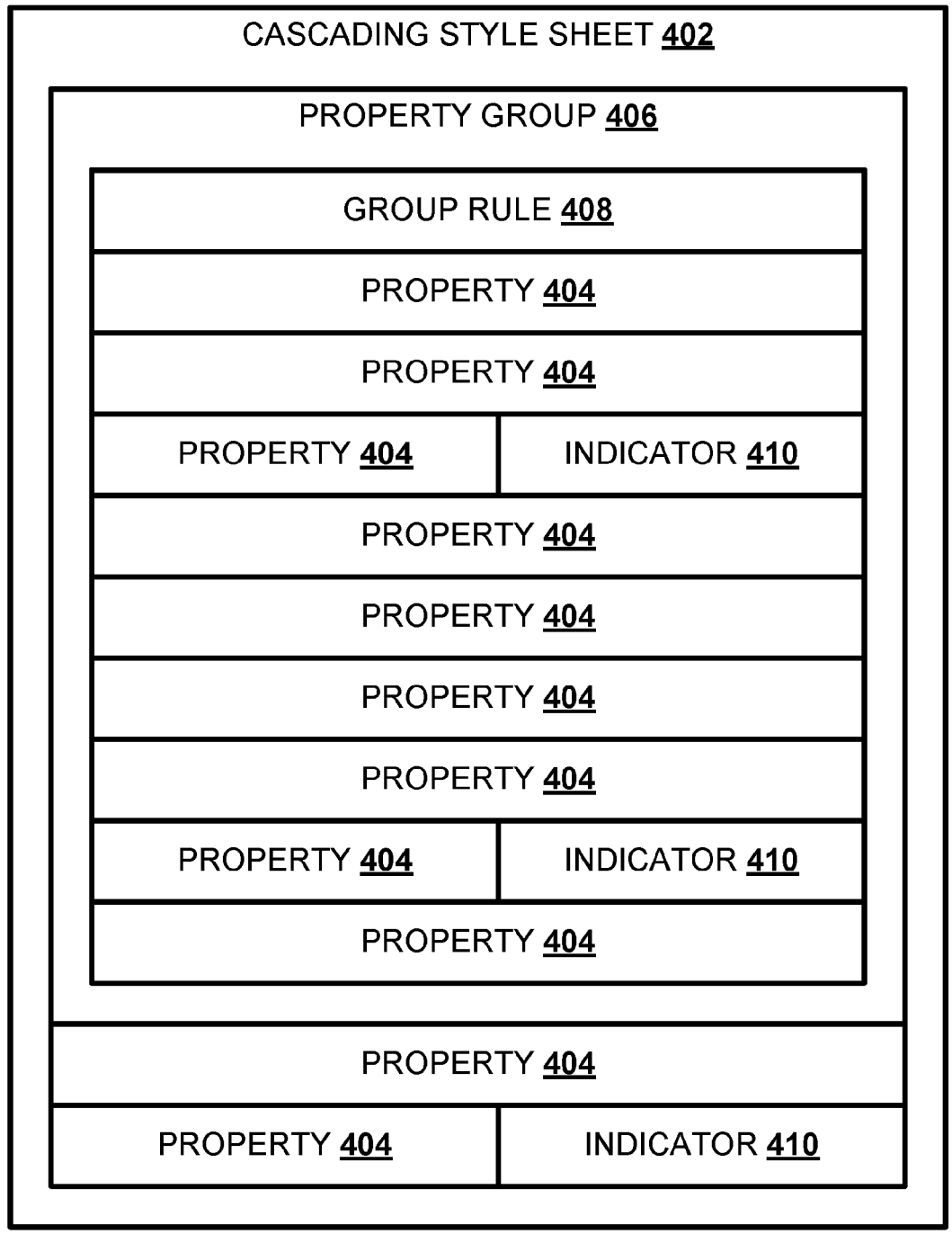
FIG. 4 illustrates, in a block diagram, one example of a cascading style sheet architecture.

FIG. 4 illustrates, in a block diagram, one example of a cascading style sheet architecture 400. A cascading style sheet 402 may list one or more properties 404 describing a style property for a document component or a document. The cascading style sheet 402 may group a subset of two or more properties 404 into a property group 406. The cascading style sheet 402 may identify a group rule 408 describing a group cascade level for the property group 406. The group rule 408 may use a "@" symbol to identify the group cascade level. The cascading style sheet 402 may alter a cascade level for an individual style property 404 using a property hierarchy indicator 410. The property hierarchy indicator 410 may use a "|" symbol to identify a property hierarchy indicator 410.

Figure 5:
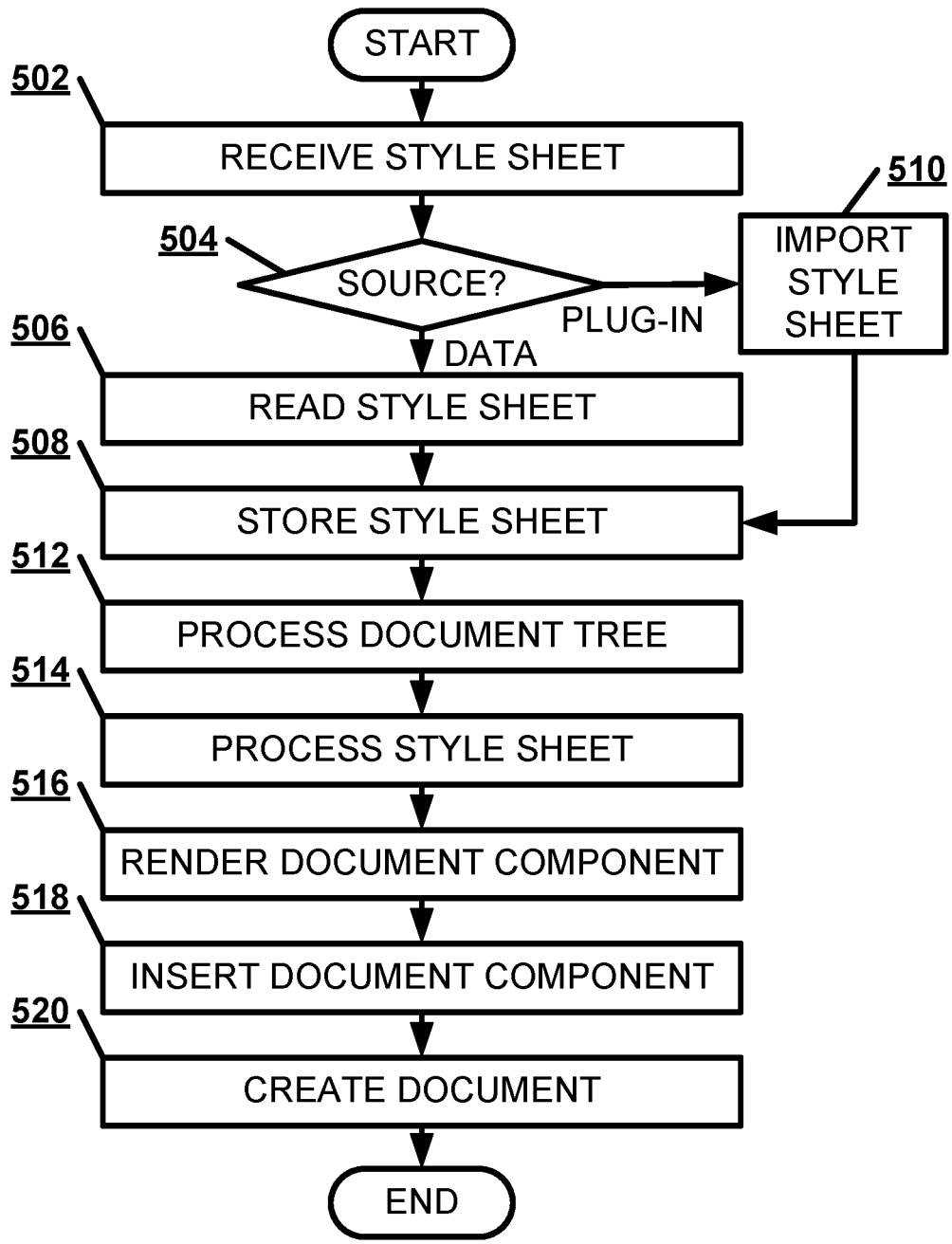
FIG. 5 illustrates, in a flowchart, one example of a method creating a document.

FIG. 5 illustrates, in a flowchart, one example of a method 500 creating a document. The document rendering device may receive a style sheet having a style property describing a formatting to be applied to a data content set (Block 502). If the document rendering device receives the style sheet as part of the data content set representing the overall document (Block 504), the document rendering device may read the style sheet as an author style sheet at an author cascade level (Block 506). The document rendering device may store the author style sheet at a normal author cascade level in a memory of the document rendering device (Block 508). If the document rendering device receives the style sheet as part of a plug-in for the rendering application (Block 504), the document rendering device may import the style sheet as a user style sheet at a user cascade level (Block 510). The document rendering device may store the user style sheet at a normal user cascade level in a memory of the document rendering device (Block 508). The document rendering device may process a document tree representing a data content set (Block 512). The document rendering device may process a style sheet describing rendering of a structured document having a nominal cascade level indicating a sheet hierarchy for the style sheet to resolve conflicts with style properties in other style sheets (Block 514). The document rendering device may render a document component of the structured document based on the style properties of the style sheet at a property cascade level or a property group at the group cascade level to create a document component (Block 516). The document rendering device may insert the document component into a document (Block 518). The document rendering device may create the document from the document components (Block 520).

Figure 6:
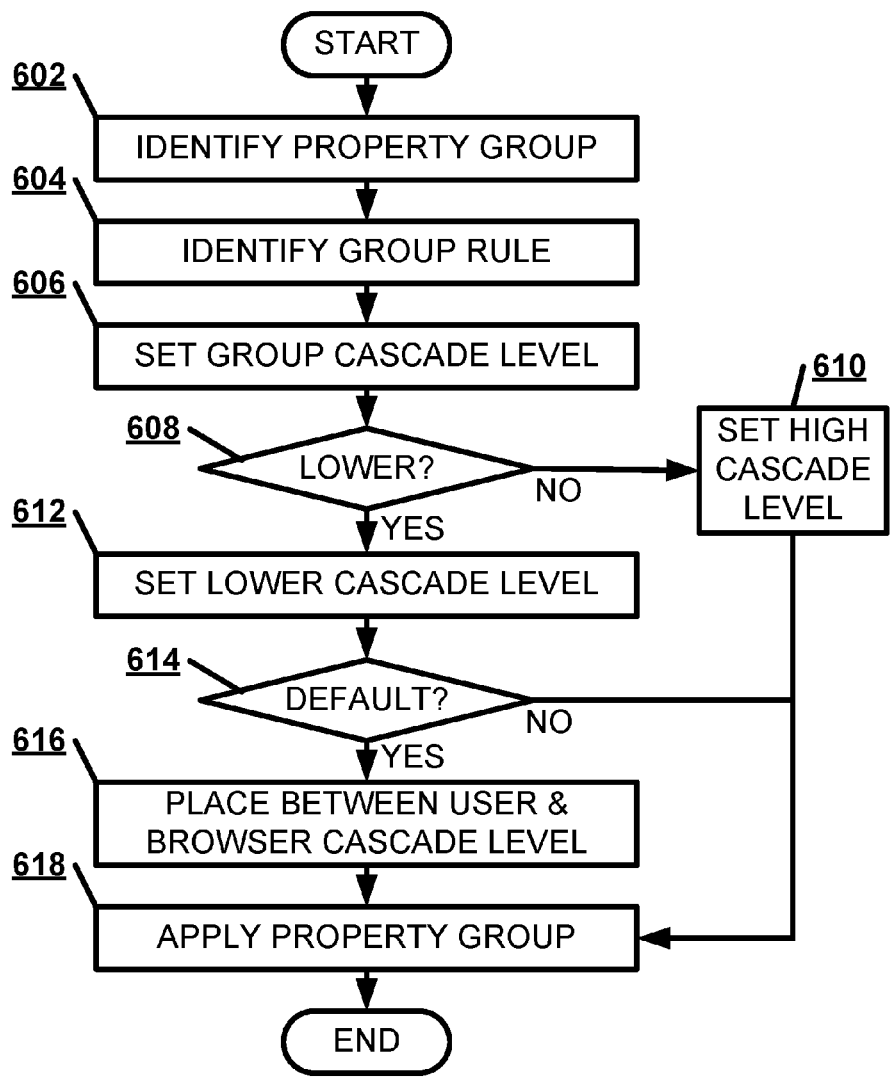
FIG. 6 illustrates, in a flowchart, one example of a method for setting a group cascade level for a property group different than a nominal cascade level.

FIG. 6 illustrates, in a flowchart, one example of a method 600 for setting a group cascade level for a property group different than a nominal cascade level. The document rendering device may identify in the style sheet a property group describing a set of multiple style properties and containing a style property (Block 602). The document rendering device may identify in the style sheet a group rule defining a group cascade level for the property group containing the style property (Block 604). The document rendering device may set a group cascade level for a property group containing the style property different from the nominal cascade level for the style sheet (Block 606). If the style sheet indicates that the group cascade level for the property group is to be higher than the nominal cascade level of the style sheet (Block 608), the document rendering device may set a group cascade level for the property group higher than the nominal cascade level for the style sheet (Block 610). If the style sheet indicates that the group cascade level for the property group is to be lower than the nominal cascade level of the style sheet (Block 608), the document rendering device may set a group cascade level for the property group lower than the nominal cascade level for the style sheet (Block 612). If the style sheet indicates that the group cascade level for the property group is to be set to a normal default cascade level (Block 614), the document rendering device may place the group cascade level for the property group between a user cascade level and a user agent cascade level (Block 616). The document rendering device may apply the property group to a document at the group cascade level (Block 618).

Figure 7:
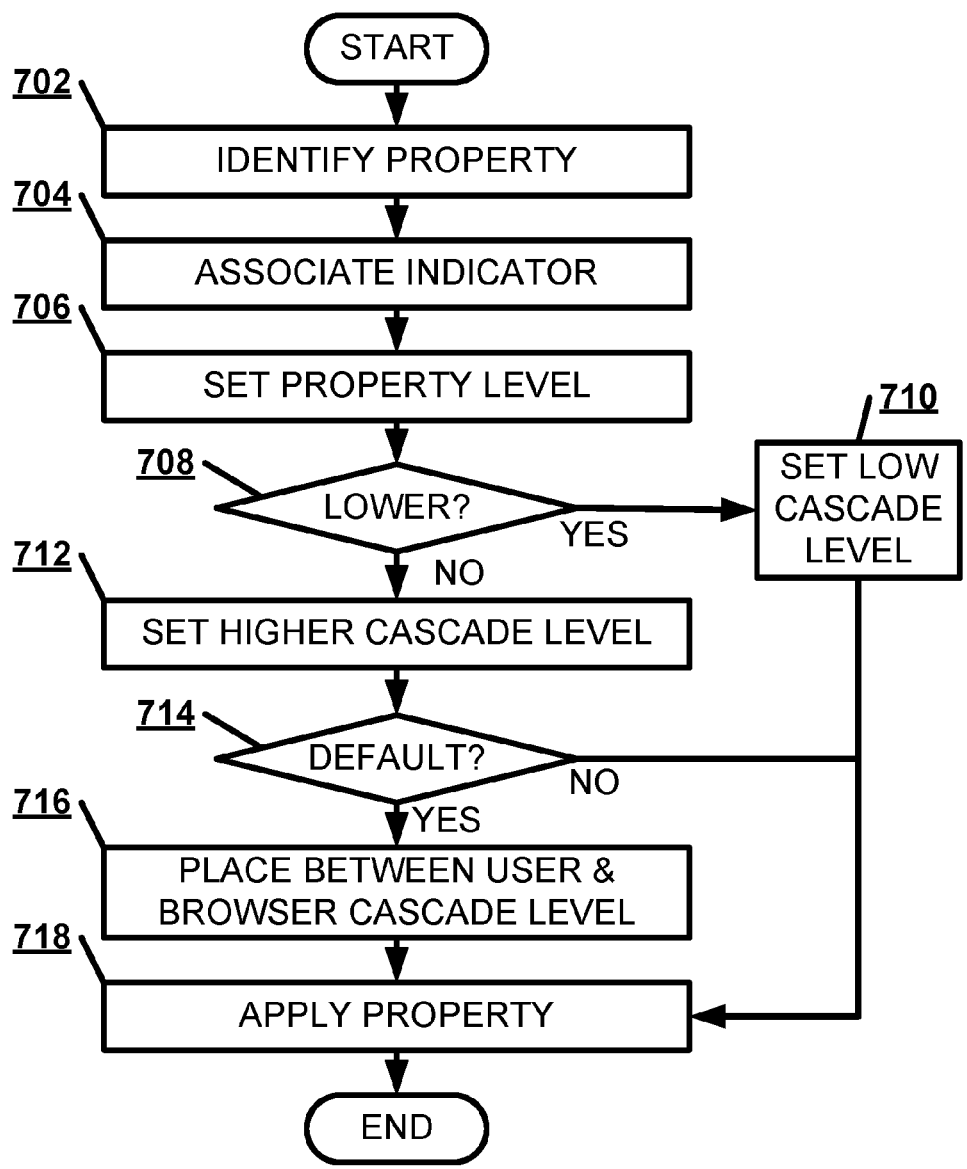
FIG. 7 illustrates, in a flowchart, one example of a method for setting a property cascade level for a style property different than a nominal cascade level.

FIG. 7 illustrates, in a flowchart, one example of a method 700 for setting a property cascade level for a style property different than a nominal cascade level. The document rendering device may identify a style property, possibly of a property group, in the style sheet (Block 702). The document rendering device may associate a property hierarchy indicator with the style property based on the style sheet (Block 704). The document rendering device may set a property cascade level for the style property based on the property hierarchy indicator (Block 706). If the style sheet indicates that the property cascade level for the style property is to be set lower than the nominal cascade level of the style sheet (Block 708), the document rendering device may set the property cascade level for the style property lower than the nominal cascade level for the style sheet (Block 710). If the style sheet indicates that the property cascade level for the style property is to be set higher than the nominal cascade level of the style sheet (Block 708), the document rendering device may set a property cascade level for the style property higher than the nominal cascade level for the style sheet (Block 712). If the style sheet indicates that the property cascade level for the style property is to be set to an important default cascade level, as part of a default group cascade level with a "|important" property hierarchy indicator (Block 714), the document rendering device may place the property cascade level for the style property between an important user cascade level and an important user agent cascade level (Block 716). The document rendering device may apply the style property to a document at the property cascade level (Block 718).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A document rendering device, comprising:
    memory configured to store a style sheet describing rendering of a structured document, the style sheet having a cascade level based on a source of the style sheet indicating a sheet hierarchy for the style sheet to resolve conflicts with style properties in other style sheets;
    a processing unit having at least one processor configured to:
        set a group cascade level for a property group describing a set of multiple style properties in the style sheet, the group cascade level being different than the cascade level of the style sheet and configured to resolve conflicts at the cascade level for the set of multiple style properties with conflicting style properties in the other style sheets according to the group cascade level instead of the cascade level of the style sheet;
        identify in the style sheet a group rule defining the group cascade level for the property group and set the group cascade level in accordance with the group rule, wherein the group cascade level is lower than the cascade level for the style sheet and the group cascade level is between a normal user cascade level and a normal user agent cascade level; and
        render a document component of the structured document based on the property group at the group cascade level; and a display screen configured to display the document component to a user.

2. The document rendering device of claim 1, wherein the at least one processor is further configured to insert the document component into the structured document.

3. The document rendering device of claim 1, wherein the at least one processor is further configured to apply the property group to the structured document at the group cascade level.

4. The document rendering device of claim 1, further comprising:
a communication interface configured to import the style sheet from at least one of a plug-in and a data content set.

5. The document rendering device of claim 1, wherein the style sheet is at least one of an author style sheet at an author cascade level and a user style sheet at a user cascade level.

6. The document rendering device of claim 1, wherein the memory is further configured to associate a property hierarchy indicator with a style property of the property group.

7. The document rendering device of claim 1, wherein the processor is further configured to set a property cascade level for a style property of the property group based on a property hierarchy indicator.

8. The document rendering device of claim 1, wherein a style property of the property group is configured to overwrite the conflicting style properties or be overwritten by one of the conflicting style properties based on a relative level of the group cascade level and the cascade level of the other style sheets having the conflicting style properties.

9. A computing device, having a memory to store a series of instructions to execute a document rendering application, the computing device configured to:
process a style sheet describing rendering of a structured document, the style sheet having a cascade level based on a source of the style sheet indicating a sheet hierarchy for the style sheet to resolve conflicts with style properties in other style sheets;
identify a style property in the style sheet;
set a group cascade level for a property group describing a set of multiple style properties in the style sheet, the group cascade level being different than the cascade level of the style sheet and configured to resolve conflicts at the cascade level according to the group cascade level instead of the cascade level of the style sheet;
identify in the style sheet a group rule defining the group cascade level for the property group and set the group cascade level in accordance with the group rule, wherein the group cascade level is lower than the cascade level for the style sheet and the group cascade level is between a normal user cascade level and a normal user agent cascade level; and
render a document component of the structured document based on the style property at the property cascade level.

10. The computing device of claim 9, wherein the method further comprises:
associating a property hierarchy indicator with the style property.

11. The computing device of claim 9, wherein the method further comprises:
reading the style sheet as an author style sheet at an author cascade level.

12. The computing device of claim 9, wherein the method further comprises:
importing the style sheet as a user style sheet at a user cascade level.

13. A machine-implemented method, comprising:
processing a style sheet describing rendering of a structured document, the style sheet having a cascade level based on a source of the style sheet indicating a sheet hierarchy for the style sheet to resolve conflicts with style properties in other style sheets;
identifying in the style sheet a property group describing a set of multiple style properties;
setting a group cascade level for the property group describing the set of multiple style properties in the style sheet, the group cascade level being different than the cascade level of the style sheet and configured to resolve conflicts at the cascade level for the set of multiple style properties with conflicting style properties in the other style sheets according to the group cascade level instead of the cascade level of the style sheet;
identifying in the style sheet a group rule defining the group cascade level for the property group and set the group cascade level in accordance with the group rule, wherein the group cascade level is lower than the cascade level for the style sheet and the group cascade level is between a normal user cascade level and a normal user agent cascade level; and
rendering a document component of the structured document based on the property group at the group cascade level.

14. The method of claim 13, further comprising:
setting a property cascade level for a style property of the property group based on a property hierarchy indicator.

* * * * *